United States Patent [19]

Nelson

[11] Patent Number: 5,819,019
[45] Date of Patent: Oct. 6, 1998

[54] SYSTEM/METHOD FOR RECOVERING NETWORK RESOURCES IN A DISTRIBUTED ENVIRONMENT, VIA REGISTERED CALLBACKS

[75] Inventor: Michael N. Nelson, San Carlos, Calif.

[73] Assignee: Silicon Graphics, Inc., Mountain View, Calif.

[21] Appl. No.: 566,310

[22] Filed: Dec. 1, 1995

[51] Int. Cl.[6] .............................. G06F 13/00; H01J 13/00
[52] U.S. Cl. ................. 395/182.02; 395/182.13; 395/184.01; 395/185.01; 395/200.11; 395/200.1; 395/200.05; 395/200.06
[58] Field of Search ..................... 395/182.02, 182.13, 395/182.19, 392, 200.06, 200.05, 329, 331, 335, 870.01, 650, 182.03, 182.23, 184.01, 185.01, 200.11, 200.1, 205.05; 364/281.6, 281.1, 468.05, 967.4, 674

[56] References Cited

U.S. PATENT DOCUMENTS

| | | | |
|---|---|---|---|
| 5,247,676 | 9/1993 | Ozur et al. ............................. | 395/650 |
| 5,263,165 | 11/1993 | Janis ..................................... | 395/725 |
| 5,276,861 | 1/1994 | Howarth ............................... | 395/575 |
| 5,276,876 | 1/1994 | Coleman et al. ..................... | 395/650 |
| 5,369,570 | 11/1994 | Parad ..................................... | 364/401 |
| 5,392,432 | 2/1995 | Englestad et al. .................... | 395/700 |
| 5,430,876 | 7/1995 | Schreiber et al. .................... | 395/650 |
| 5,442,791 | 8/1995 | Wrabetz et al. ...................... | 395/650 |
| 5,446,901 | 8/1995 | Owicki et al. ........................ | 395/700 |
| 5,459,871 | 10/1995 | Van Den Berg ...................... | 395/650 |
| 5,485,613 | 1/1996 | Engelstad et al. .................... | 395/650 |
| 5,519,863 | 5/1996 | Allen et al. ........................... | 395/650 |
| 5,559,955 | 9/1996 | Dev et al. ......................... | 395/182.02 |
| 5,596,720 | 1/1997 | Hamada et al. ................. | 395/200.03 |

*Primary Examiner*—Robert W. Beausoliel, Jr.
*Assistant Examiner*—Norman M. Wright
*Attorney, Agent, or Firm*—Sterne, Kessler, Goldstein & Fox P.L.L.C.

[57] ABSTRACT

A system and method for resource recovery in a distributed system uses a resource audit service to monitor the status of a client that receives a resource from a service that allocates the resource. The allocating service registers a callback with the resource audit service identifying the client. The resource audit service subsequently monitors the status of the client. When the resource audit service determines that the client has failed, the resource audit service performs the callback to the allocating service indicating the failure of the client. Upon receiving the callback, the allocating service is able to recover the resource from the client.

7 Claims, 11 Drawing Sheets

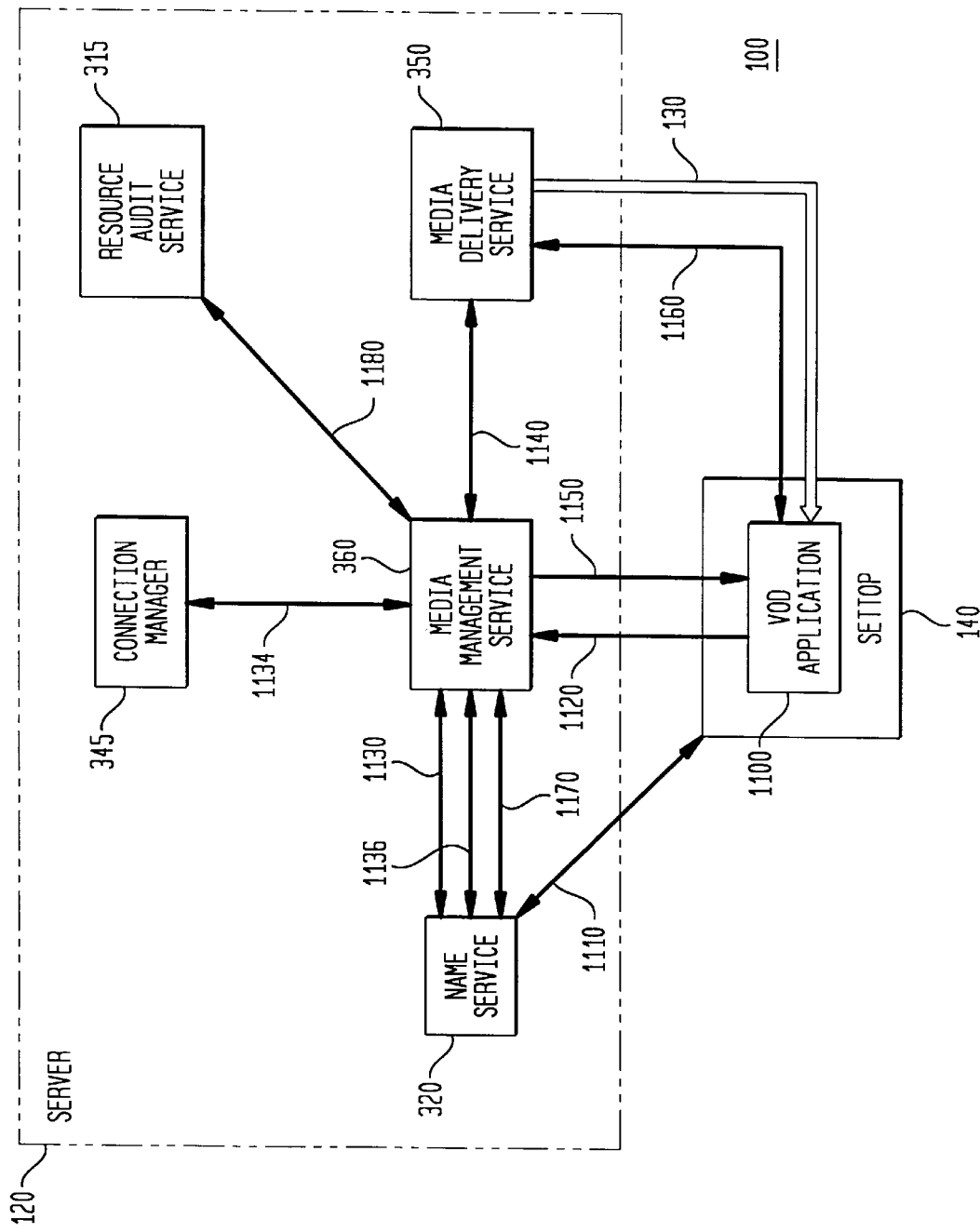

SYSTEM/METHOD FOR RECOVERING NETWORK RESOURCES IN A DISTRIBUTED ENVIRONMENT, VIA REGISTERED CALLBACKS

RELATED APPLICATION

This application is related to a commonly owned application, filed concurrently herewith, entitled "System and Method for Transparently Exporting Replicated Services", application Ser. No. 08/566,311, filed on Dec. 1, 1995, which is incorporated herein by reference.

BACKGROUND OF THE INVENTION

1. Field of the Invention

The present invention relates generally to distributed systems, and more specifically, to recovering allocated resources when a service using those resources fails.

2. Related Art

In a distributed system, such as an interactive television system, a distributed object combines the features of remote procedure calls and object-oriented programming. Interaction between components in the distributed system is implemented via one or more distributed objects. The distributed object ("object") typically represents a service that is provided by a component in the distributed system. The object is defined by an interface which allows access to the service. The object hides the representation of its state and the methods used to implement its operations. The operations that are available on a particular object are defined in a specification for the particular object.

For example, a service might be a file located on a hard drive in a computer in the distributed system. An object representing the service has an interface that includes the operations of read and write. In order to access the service, a requester of the service need not know the physical address of the file nor even the computer where it exists in the distributed system.

A requester of a service is referred to as a client of the object providing the service. The object providing the service is referred to as a server of the requestor. Typically, an object has both client and server relationships with other objects.

A server that provides a service makes the service available to a client by first creating an object reference that denotes a particular object representing an instance of the service. The object reference identifies the same object each time the object reference is used. A server accomplishes this by binding the object reference into a name service.

The name service makes the service available to a client when the client requests the service. The name service may do this using replicated contexts. Replicated contexts are discussed in greater detail in the above referenced copending application entitled "System and Method for Transparently Exporting Replicated Services."

When a client desires to gain access to a particular service, the client requests that the name service provide the client with a specific object reference. This process is referred to as resolving a reference. The client requests a particular service and the name service provides the client with an object reference representing an instance of that service.

The client requests aspects of the service by invoking operations on the object reference obtained from the name service or some other service. Object references may be passed as parameters to operations and returned as the result of operations.

Object references are only valid as long as the implementor of the object reference (i.e., the particular component in the distributed system on which the server is running) is alive. If the implementor crashes or halts, the object reference becomes invalid. The client will detect this on the next attempt to use the object reference. The client will then be able to obtain another object reference to another object providing the same service.

Services normally represent resources (e.g. network connections) that are allocated to clients as objects. When a service allocates a resource to a client, the service creates an object that represents the resource and provides the object to the client. Under normal circumstances, when the client finishes using the resource, the client releases the object reference. This allows other clients to subsequently use the same resource. However, if the client fails (i.e., halts, crashes, etc.), the object reference remains valid and the resource remains tied to the failed client. Thus, the resource is not being utilized, and yet, remains unavailable to other clients desiring the resource. This is referred to as resource leakage.

Conventional systems use timeouts to recover resources allocated to failed clients. One type of conventional system sets a timeout as the expected length of time the resource would be utilize by the client. When this length of time has expired, the server reclaims the resource. In most cases, this length of time is set conservatively so that the resource is not reclaimed while the client is still utilizing it. In systems where client failure is frequent, this system is inadequate to stop resource leakage.

Another type of conventional system sets the timeout for a short period of time. In this system, the client must periodically reallocate the resource. In this type of system, reallocation requests may unnecessarily consume a large amount of network bandwidth. This approach is inadequate in a large distributed network having thousands of clients each utilizing multiple resources.

A third type of conventional system does not use a timeout. In this type of system, the server that allocates resources tracks the clients to which it has allocated resources. When the client exits or fails, the server recovers the resources. This particular approach, referred to as distributed garbage collection, also requires a significant amount of network bandwidth as each server must periodically check the status of the clients to which it has allocated resources. Thus, this approach is also inadequate in a large distributed network.

What is needed is a system and method for recovering resources in a distributed network that reduces resource leakage without requiring significant amounts of network bandwidth.

SUMMARY OF THE INVENTION

The present invention is a system and method for recovering resources in a distributed network. The present invention uses a resource audit service that establishes and maintains a status of one or more clients that have received resources from one or more services that allocate those resources. The allocating service is able to determine the status of the client through the resource audit service rather than by monitoring the client itself.

The resource audit service, together with a service controller, implements a callback operation associated with the client. When the allocating service allocates a resource to the client, the allocating service registers a callback with the resource audit service identifying the client as a recipient of the resource. The resource audit service subsequently monitors the client. Upon failure of the client, the resource audit service performs the callback to the allocating service notifying it of the failure of the client. After receiving the callback, the allocating service can recover the resource from the client.

One of the features of the present invention is that the allocating service does not have to directly monitor the status of each client to which it has allocated resources. The resource audit service provides a central location from which the status of each client can be determined.

Another feature of the present invention is that an allocating service is not required to poll or ping the client. For clients that otherwise may have long response times to polling or pinging, the resource audit service eliminates false determinations that the client has failed.

A further feature of the present invention is that the allocating service is released immediately after initiating a status check of the client with the resource audit service. After the status check is initiated, the resource audit service determines the status and notifies the allocating service regarding the failure of the client via a callback.

Yet another feature of the present invention is that the allocating service is able to determine the status of a non-local client through the resource audit service. In this case, the resource audit service polls a local instance of the resource audit service local to the non-local client. The local instance of the resource audit service returns the status of the non-local client to the local instance of the resource audit service. Thus, only the various instances of the resource audit service utilize network bandwidth to determine the status of various clients operating in the system. Ultimately, this reduces the overall flow of messages occurring in the network devoted to determining client status.

Still another feature of the present invention is the simple start up and recovery mechanism used by the resource audit service. This mechanism allows the resource audit service to start up and recover without remembering or being aware of the state of any clients or callbacks associated with the clients. This reduces the overall complexity of the entire distributed system.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 11 is a block diagram of the services used in a typical video-on-demand session in an interactive television system according to a preferred embodiment of the present invention.

DETAILED DESCRIPTION OF THE EMBODIMENTS

System Overview

The present invention is directed towards a system and method for recovering resources in a distributed system. The present invention is useful in a system where an allocating service allocates a resource to a client. The present invention allows the allocating service to recover the resource from the client when the client fails.

Example Environment

The invention is described in terms of an interactive television (ITV) system implemented on a distributed network. This example is provided for illustrative purposes only and should not be construed as a limitation. As will become apparent upon reading the following disclosure, the present invention can be applied to other applications employing distributed networks or other network configurations as well.

Figure 1:
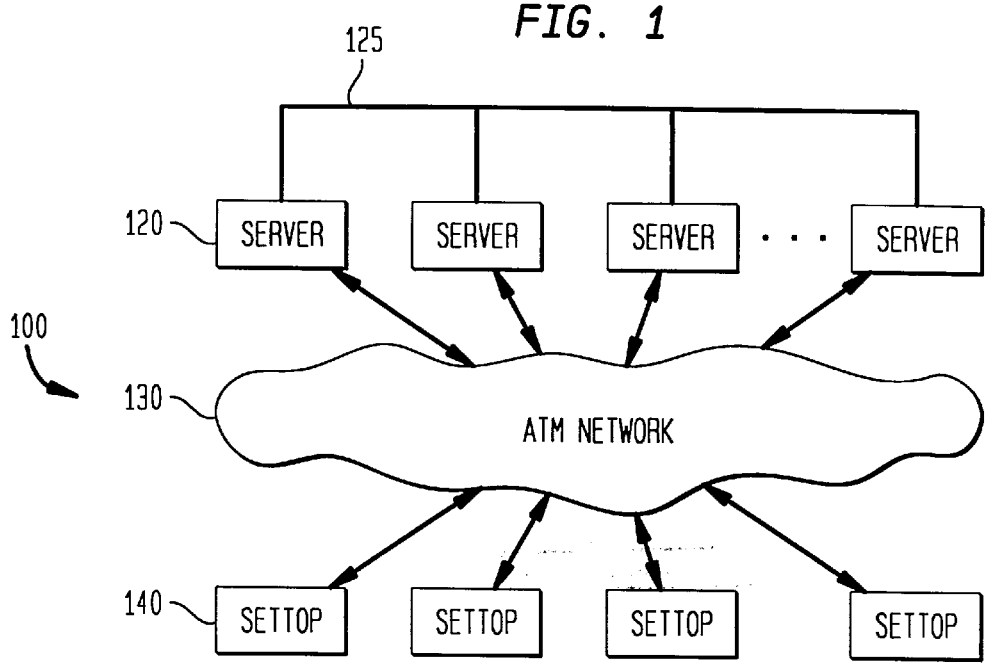
FIG. 1 illustrates a distributed network of a preferred embodiment of the present invention.

FIG. 1 illustrates an interactive television system 100. ITV system 100 includes one or more remote servers 120 and a plurality of settop computers 140 (settop 140). Remote servers 120 are connected to each other via a fiber distributed data interface (FDDI) network 125. Remote servers 120 are connected to settops 140 via an asynchronous transfer mode network 130 (ATM network 130). Settop 140 functions as an interface between ITV system 100 and a television (not shown).

Figure 2:
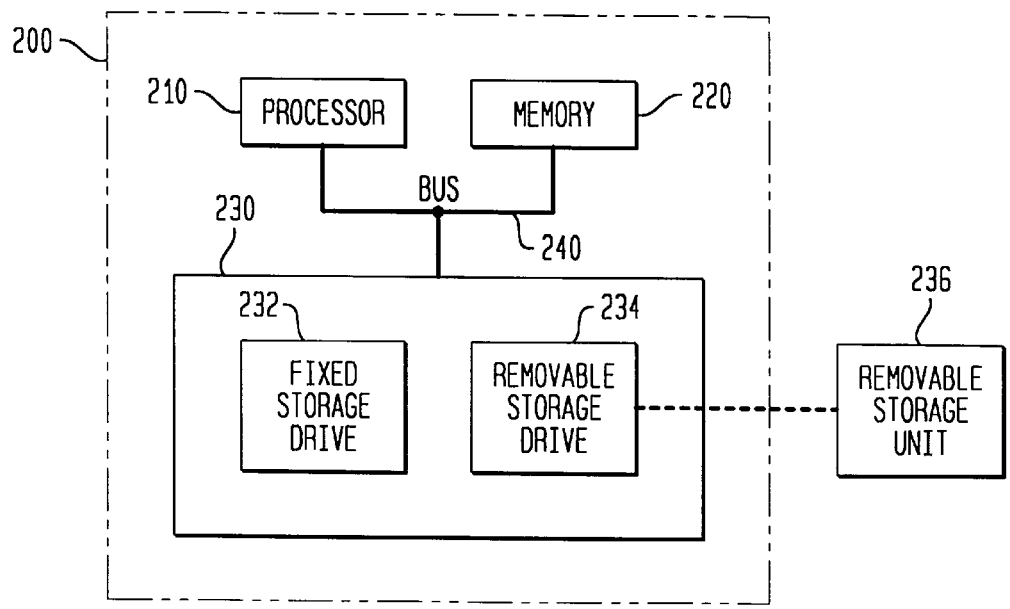
FIG. 2 illustrates an exemplary hardware configuration for remote servers and settops.

In one embodiment, the present invention is directed to a computer system operating as discussed herein. An exemplary hardware configuration 200 for both remote server 120 and settop 140 is shown in FIG. 2. Hardware configuration 200 may include one or more processors, such as processor 210, a main memory 220, preferably random access memory (RAM), and an optional secondary memory 230, all connected via a communication bus 240.

Secondary memory 220 may include, for example, a hard disk drive 232 and/or a removable storage drive 234 (representing a floppy disk drive, a magnetic tape drive, a compact disk drive, or the like). Removable storage drive 234 reads from and/or writes to a removable storage unit 236 in a well known manner.

Removable storage unit 236, also called a program storage device or a computer program product, represents a floppy disk, magnetic tape, compact disk, etc. As will be appreciated, removable storage unit 236 includes a computer usable storage medium having stored therein computer software and/or data.

Computer programs (also called computer control logic) are stored in main memory 220 and/or the secondary memory 230. Such computer programs, when executed, enable remote server 120 and settop 140 to perform the features of the present invention as discussed herein. In particular, the computer programs, when executed, enable each processor 210 to perform its tasks according to the features of the present invention. Accordingly, such computer programs represent controllers of hardware configuration 200.

In another embodiment, the invention is directed to a computer program product comprising a computer readable medium having control logic (computer software) stored therein. The control logic, when executed by processor 210, causes processor 210 to perform the functions of the invention as described herein.

In still another embodiment, the invention is implemented primarily in hardware using, for example, a hardware state machine. Implementation of the hardware state machine so as to perform the functions described herein will be apparent to persons skilled in the relevant art(s). In yet a further embodiment, the invention is implemented in a hybrid system comprising both hardware and software.

An amount of network bandwidth available from settop 140 to server 120 (referred to as upstream bandwidth) as well as an amount of network bandwidth available from server 120 to settop 140 (referred to as downstream bandwidth) may vary widely. In a preferred embodiment of the present invention, settop 140 is allowed a maximum of 50 kilobits per second kbps) of upstream bandwidth and a maximum of 6 megabits per second (Mbps) of downstream bandwidth. In other embodiments of the present invention, the allocation of upstream and downstream bandwidth varies as a function of the application, the particular network being used, and the particular hardware connected to the network.

In a preferred embodiment of the present invention, settops 140 are partitioned into neighborhoods determined by an Internet Protocol address (IP address) associated with settop 140 for purposes of load balancing and administration. In this embodiment, each server 120 is responsible for providing services to settops 140 in one or more neighborhoods.

Figure 3:
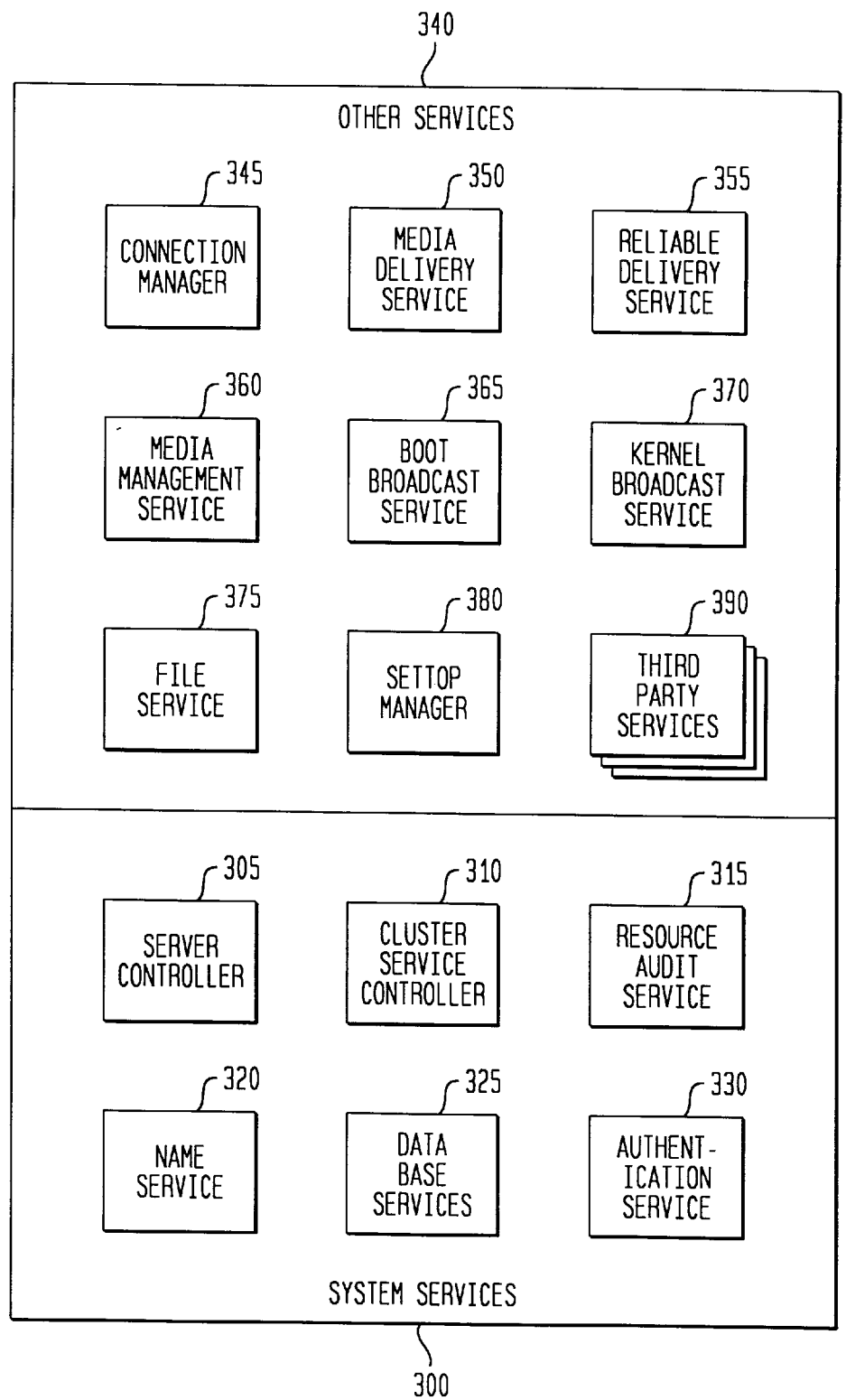
FIG. 3 illustrates services typically available in a preferred embodiment of the present invention.

FIG. 3 illustrates services that are typically available on each server 120 in a preferred embodiment of the present invention including system services 300 and other services 340. System services 300 include a service controller service 305, a cluster service controller 310, a resource audit service 315, a name service 320, database services 325, and an authentication service 330.

The functions of each of system services 300 are briefly described. Further details of the services required to implement the present invention are provided in other sections of the present disclosure. Service controller 305 and cluster service controller 310 manage the assignment of instances of services to servers 120, starting services when server 120 becomes active, and restarting services when server 120 fails. Resource audit service 315 provides support for reclaiming system resources. Name service 320 allows clients to locate each of the other available system services 300 and other services 340. Database services 325 provide access to persistent data via exported interface database language (IDL) interfaces. Authentification service 330 implements a security policy for the system.

Other services 340 include a connection manager 345, a media delivery service 350, a reliable delivery service 355, a media management service 360, a boot broadcast service 365, a kernel broadcast service 370, a file service 375, a settop manager service 380, and other third party services 390.

The functions of each of other services 340 are now briefly described. Further detail of the services required to implement the present invention is provided in other sections of the present disclosure. Connection manager 345 allocates ATM connections between servers 120 and settops 140. Media delivery service 350 delivers constant bit rate data (e.g. MPEG video) from servers 120 to settops 140. Reliable delivery service 355 downloads variable bit rate data (e.g. fonts, images, and binaries) from servers 120 to settops 140. Media management service 360 selects which media delivery service 355 to use to deliver data to settop 140 and sets up the required ATM connection. Boot broadcast service 365 broadcasts boot parameters to settops 140. Kernel broadcast service 370 broadcasts a kernel to settops 140. File service 375 provides settops 140 access to UNIX files. Settop manager 380 maintains information on a status (either up or down) of settop 140.

Service Controller

Service controller (SC) 305 is responsible for the initial start-up of services 300, 340 as well as restarts occasioned by failure. An instance of SC 305 runs on each server 120 in ITV system 100. Each instance of SC 305 is responsible for all services 300, 340 operating on that particular server 120.

In a preferred embodiment of the present invention, SC 305 provides two operations that allow resource audit service 315 (discussed below) to track the state of services 300, 340 for which SC 305 is responsible. These operations are notifyReady and registercallback.

The notifyReady operation accepts a process identification and a list of objects. The notifyReady operation records an association between the process identification and the list of objects used by services 300, 340. Each service 300, 340 invokes notifyReady to register any objects it exports. Thus, each exported object becomes associated with a particular service 300, 340. This allows SC 305 to maintain a complete list of objects for which it is responsible.

The registerCallback operation allows a caller of the operation to register a callback object ("callback") that will be invoked when the list of objects maintained by SC 305 changes. The callback win be invoked when objects are added to the list as well as when objects are deleted from the list. Thus, when a service 300, 340 registers its objects using notifyReady, the callback is invoked to the caller with a list of the newly registered objects. Likewise, when a service 300, 340 fails, the callback is invoked to the caller with a list of objects associated with failed service 300, 340.

Resource Audit Service

Figure 4:
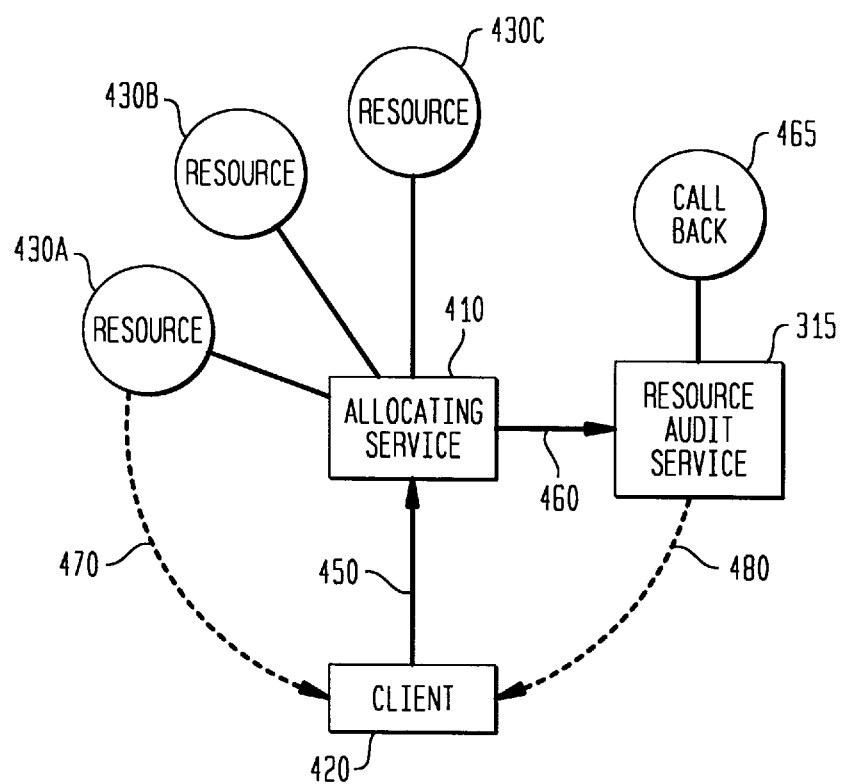
FIG. 4 is a block diagram of one embodiment of a resource audit service according to the present invention.

The present invention is directed toward recovering resources in a distributed system. In a preferred embodiment of the present invention, resource recovery is handled by resource audit service (RAS) 315. FIG. 4 illustrates an operation of one embodiment of RAS 315. In this embodiment, a client 420 requests a resource, such as a resource 430A, a resource 430B, or a resource 430C, from an allocating service 410. Resources 430A–C (referred to collectively as resource 430) are instances of different resources.

Allocating service 410 allocates resource 430 to client 420. Allocating service 410 registers the allocation of resource 430 with RAS 315. As a result of the registration, RAS 315 monitors a status of client 420. During normal operation, when client 420 no longer requires resource 430, client 420 explicitly releases resource 430 allowing its recovery by allocating service 410. However, when client 420 fails, RAS 315 notifies allocating service 410 indicating that client 420 has failed. This allows allocating service 410 to recover resource 430.

Client 420 may fail in a variety of different ways. For purposes of this discussion, "fail" refers to any abnormal condition where client 420 has terminated its processing. These conditions arise as a result of hardware problems (e.g., board failures, part failures, etc.), electrical problems (e.g., power interruption, breaks in communication lines, etc.), and software problems (e.g., buggy code, etc.). This list is not intended to be exclusive. Rather, the list is intended to demonstrate the broad range of conditions that may cause client 420 to abnormally terminate.

Figure 5:
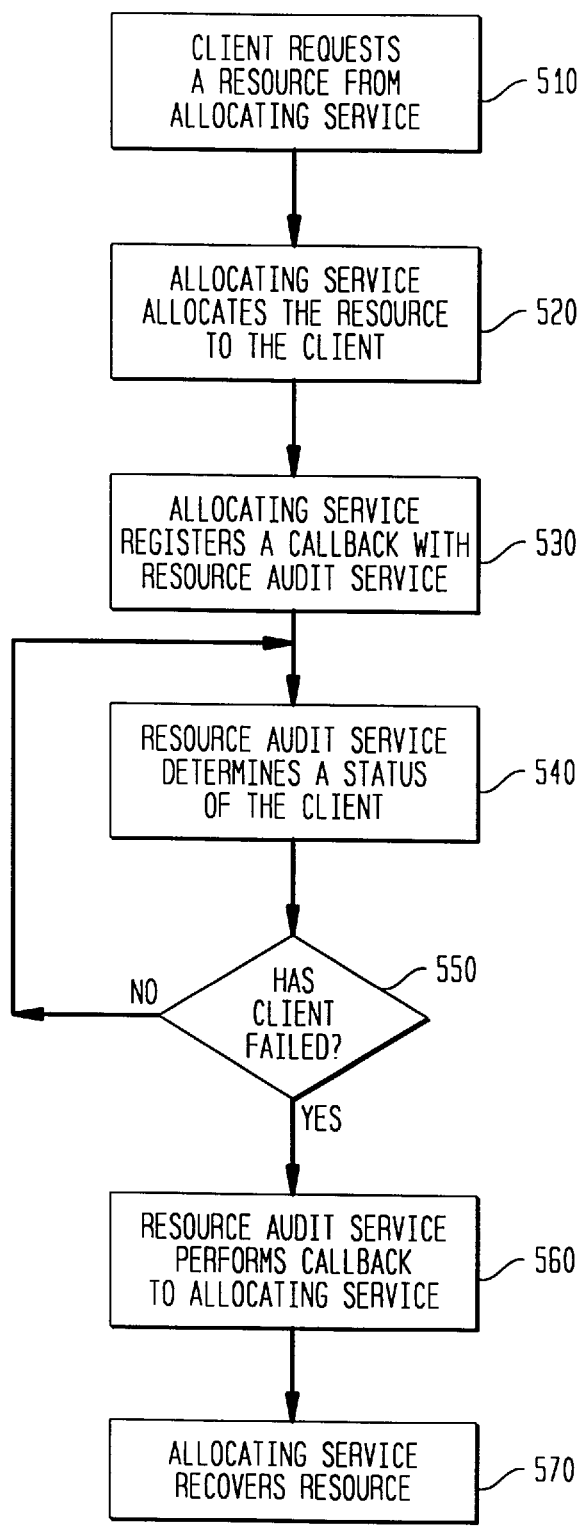
FIG. 5 illustrates the operations performed by one embodiment of the resource audit service.

A more detailed discussion of the operation of RAS 315 is discussed in reference to FIG. 4 and FIG. 5. In a step 510, client 420 issues a request 450 for resource 430 to allocating service 410. Request 450 may take the form of invoking a particular method, for example, open, on an instance of resource 430. Request 450 serves to identify client 420 and which resource 430 is desired.

In a step 520, allocating service 410 allocates resource 430 to client 420 (shown as resource 430A connected to client 420 by hashed line 470). In a step 530, allocating service 410 registers a callback 465 (shown as line 460) with RAS 315. Callback 465 identifies client 420 as being the recipient of a resource from allocating service 410. Callback 465 is discussed in further detail below.

In a step 540, RAS 315 periodically determines a status 480 of client 420 (shown as hashed line 480 between RAS 315 and client 420). This determination of status 480 is discussed in further detail below. In a decision step 550, if status 480 indicates that client 420 is has not failed, RAS 315 takes no action and processing continues at step 540. If status 480 indicates that client 420 has failed, processing continues at a step 560.

In step 560, after RAS 315 has determined that client 420 has failed, RAS 315 performs callback 465 to allocating service 410. In a step 570, allocating service 410 recovers resource 430 from client 420.

Resource Audit Service Implementation

Figure 10:
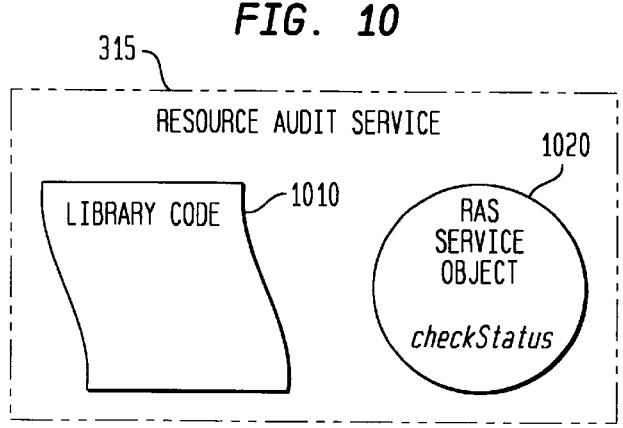
FIG. 10 illustrates a preferred implementation of the resource audit service.

FIG. 10 illustrates an implementation of RAS 315. In a preferred embodiment of the present invention, RAS 315 is implemented by a combination of a library code 1010 and a RAS service object 1020. Together, library code 1010 and RAS service object 1020 RAS implement callback 465 described above.

RAS service object 1020 provides a single operation, checkstatus, which accepts a list of objects and returns a status of each of the objects. According to the present invention, checkstatus is called to determine the status of clients 420.

Library code 1010 periodically invokes checkStatus with the list of clients 420 that have been allocated resources 430. In a preferred embodiment of the present invention, library code 1010 is included in the executable memory of each allocating service 410. When an allocating service registers a callback 465 with RAS 315, allocating service 410 is actually registering a callback 465 with library code 1010 in its own memory. In this embodiment, library code 1010 in allocating service 410 periodically invokes checkStatus of RAS service object 1020 with the list of clients 420 to which allocating service 410 has allocated resources 430. If checkstatus indicates that a particular client 420 is no longer alive, library code 1010 performs callback 465 to allocating service 410.

Figure 6:
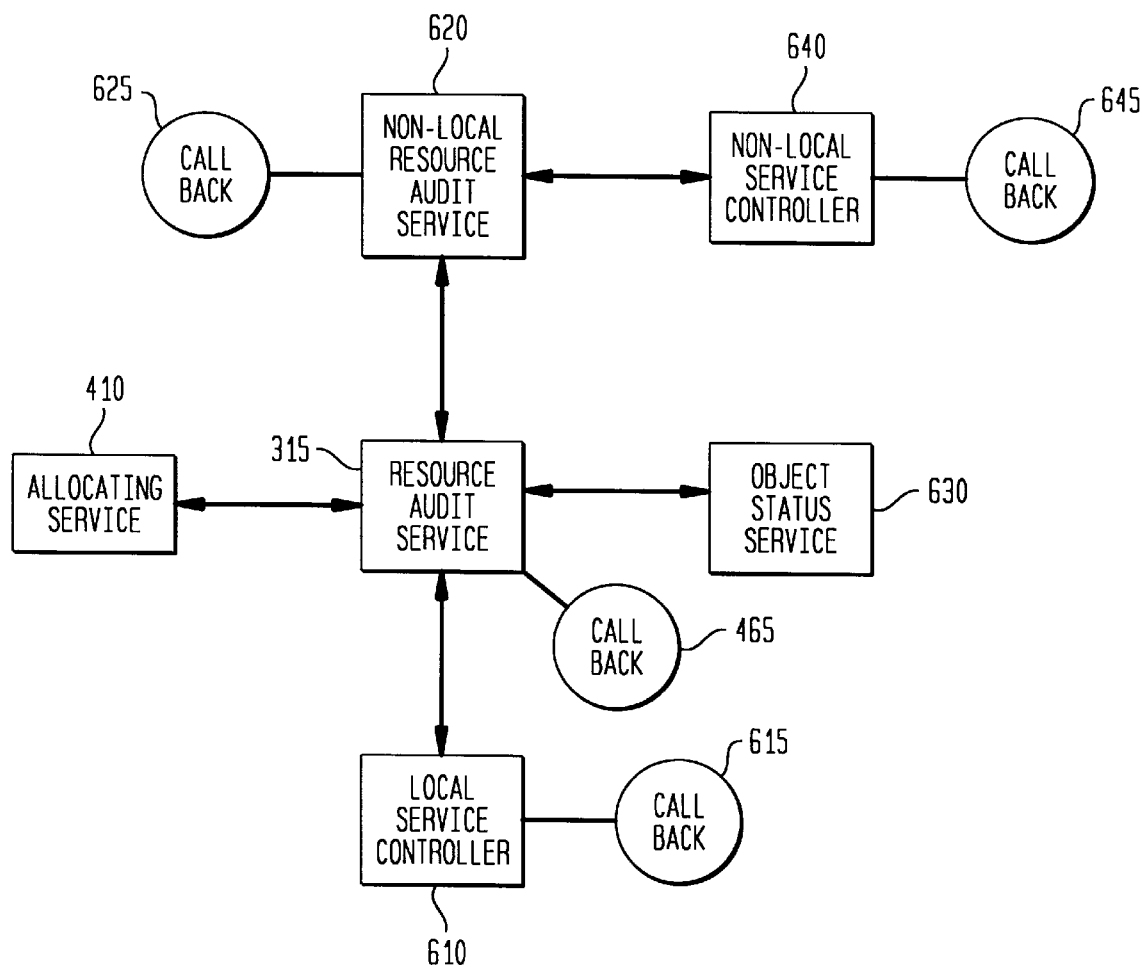
FIG. 6 illustrates various scenarios for which the resource audit service must determine a status of a client.

FIG. 6 illustrates various scenarios for which RAS 315 must determine a status of client 420. Three scenarios are included in the preferred embodiment of the present invention. The first scenario occurs when RAS 315 and client 420 are operating on the same server 120. In this scenario, client 420 is referred to as being "local" to RAS 315. The first scenario is discussed in further detail below.

The second scenario occurs when client 420 is operating on a different server from RAS 315. In this scenario, client 420 is referred to as being "non-local" to RAS 315, or non-local client 420. For purposes of this disclosure, "local" and "non-local" are used with respect to RAS 315. Also, for purposes of this discussion, all "non-local" entities (i.e. services, objects, etc.) are "non-local" with respect to RAS 315, but "local" with respect to each other. As will be appreciated by those of ordinary skill in the art, this is done for purposes of simplification rather than limitation. The second scenario is discussed in further detail below.

The third scenario occurs when client 420 is not local to any instance of RAS 315 operating on any server 120. Such a client 420 is referred to as a foreign client 420. Foreign client 420 has an associated service that is aware of its status. In this case, foreign client 420 may be operating on a foreign processor not normally affiliated with servers 120. The associated service is implemented to communicate back a status of foreign client 420 back when queried. Each of these scenarios is now discussed in further detail.

Local Clients

Figure 7:
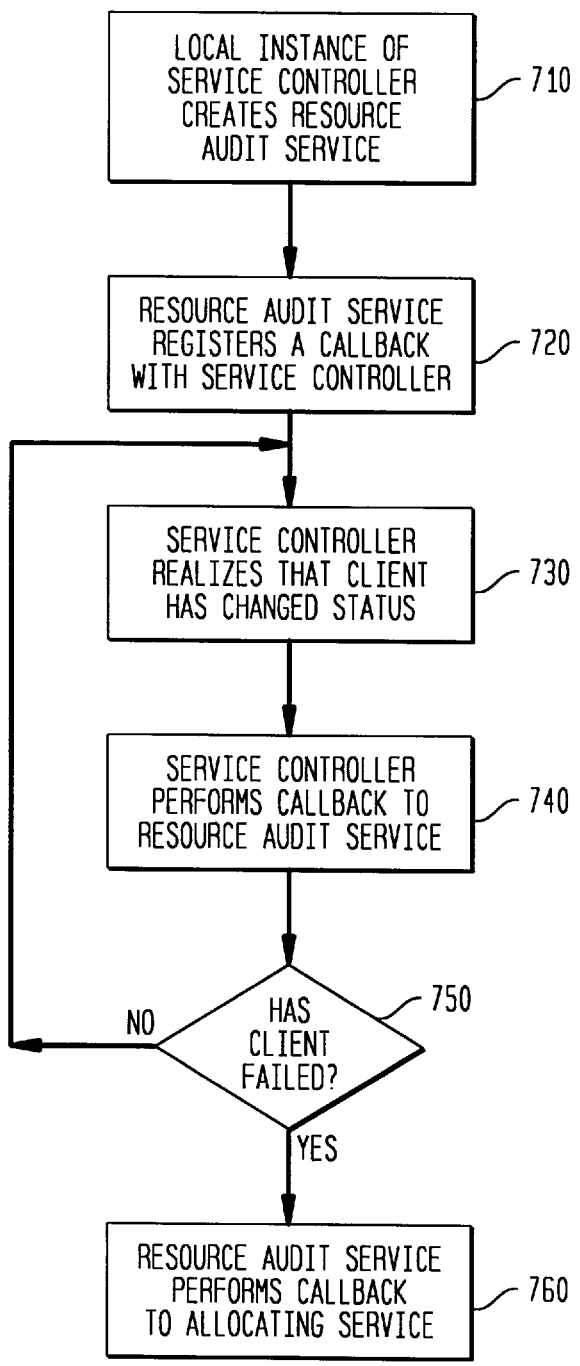
FIG. 7 illustrates the operations performed by the resource audit service for local clients.

The first scenario is discussed with reference to FIG. 6 and FIG. 7. In this scenario, client 420 is local to RAS 315. In a step 710, a local instance 610 of SC 305 creates RAS 315. In a step 720, after being created, RAS 315 registers a callback 615 with SC 305 by invoking registercallback. As discussed above, SC 305 maintains a list of all clients for which it is responsible.

In a step 730, when the status of any of the clients 420 changes, SC 305 becomes aware of that change. In the preferred embodiment of the present invention, SC 305 becomes aware of that change when the list of clients for which it is responsible changes. In a step 740, SC 305 performs callback 615 to RAS 315 with a new list of clients 420.

In a decision step 750, RAS 315 determines, based on the list of clients 420 provided by SC 305 via callback 615, whether any client 420 has failed for which RAS 315 has callback 465. If a client 420 has failed, in a step 760, RAS 315 performs callback 465 to allocating service 410 notifying allocating service 410 of the failure of client 420. Otherwise, processing continues at step 730.

Non-Local Clients

Figure 8:
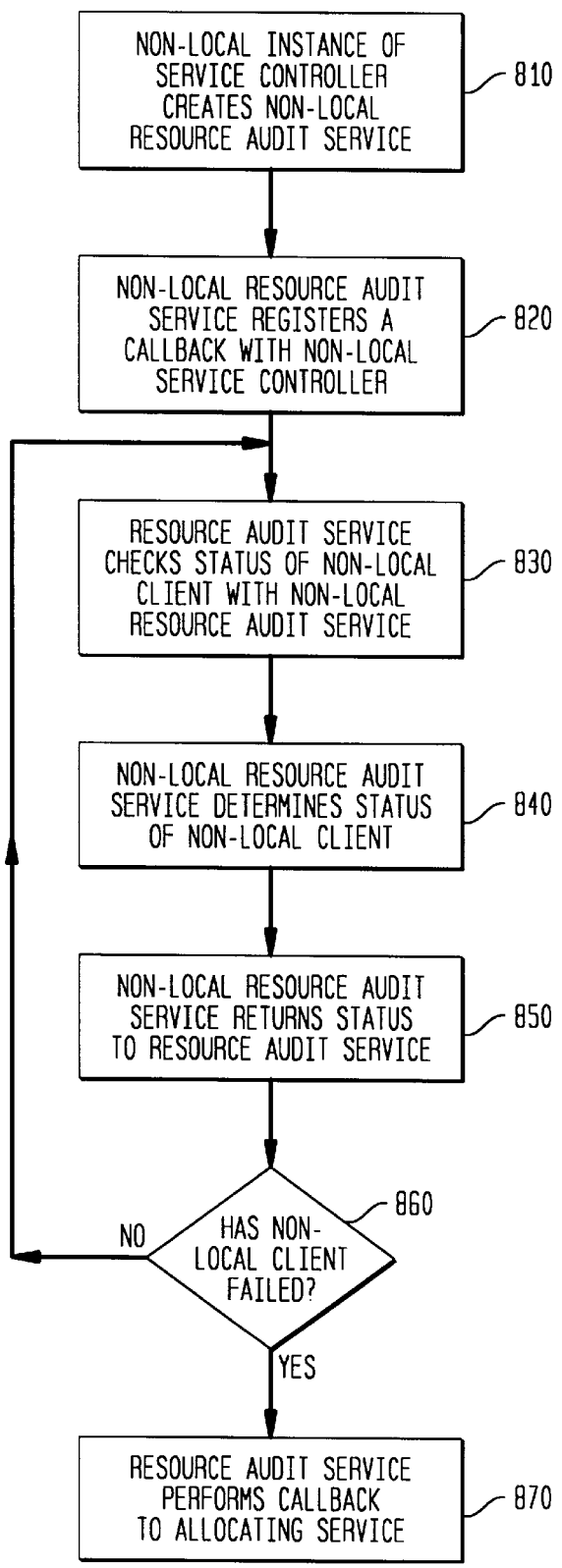
FIG. 8 illustrates the operations performed by the resource audit service for non-local clients.

The second scenario is discussed with reference to FIG. 6 and FIG. 8. In this scenario, client 420 is non-local to RAS 315. Following the convention set forth above, non-local RAS 620, non-local instance 640 of SC 305, and non-local client 420 are local to each other, but non-local to RAS 315.

In a step 810, a non-local SC 640 creates a non-local RAS 620. In a step 820, non-local RAS 629 registers a callback 645 with non-local SC 640. This is similar to steps 710 and 720 of FIG. 7 discussed above. In a step 830, RAS 315 queries non-local RAS 620 regarding a status of non-local client 420. In a preferred embodiment of the present invention, RAS 315 queries non-local RAS 620 using checkStatus with a list of non-local clients including non-local client 420.

In a step 840, non-local RAS 620 determines the status of non-local client 420. In this case, non-local client 420 is local to non-local RAS 620. Thus, non-local RAS 620 determines a status of non-local client 420 following the scenario described above with respect to local clients. In a step 850, non-local RAS 620 returns the status of non-local client 420 to RAS 315.

In a decision step 860, RAS 315 determines whether non-local client 420 has failed based on the status from non-local RAS 620. If non-local client 420 has failed, processing continues at a step 870. Otherwise processing returns to step 830. In step 870, RAS 315 performs callback 465 to allocating service 410 notifying allocating service 410 that non-local client 420 has failed.

Foreign Clients

Figure 9:
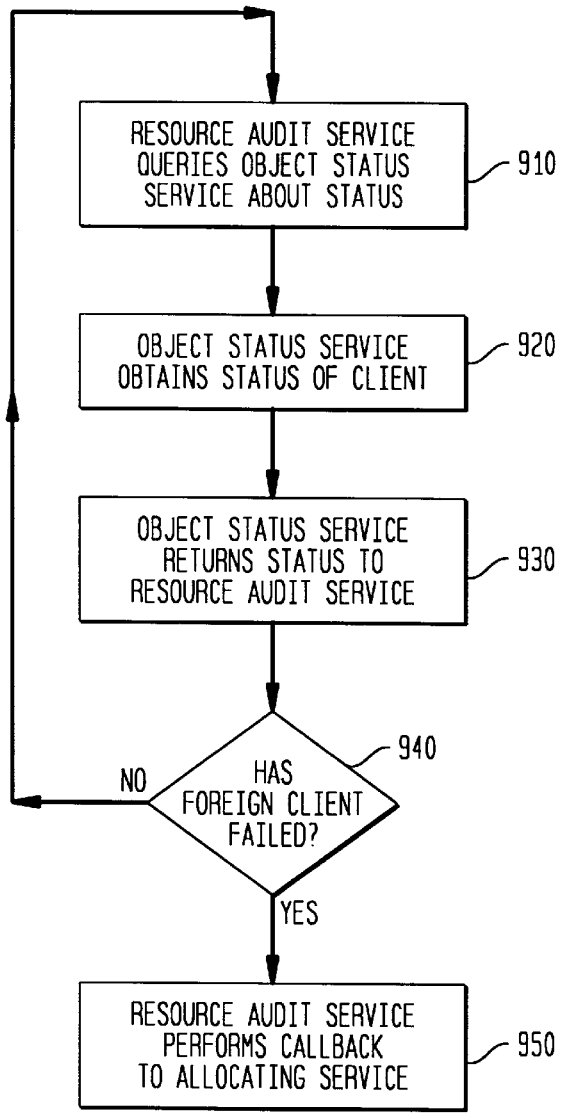
FIG. 9 illustrates the operations performed by the resource audit service for foreign clients.

The third scenario is discussed with reference to FIG. 6 and FIG. 9. In this scenario, foreign client 420 is not created by an instance of SC 305. Rather, in this scenario, an object status service 630 is aware of or has access to the status of foreign client 420. Object status service 630 may be implemented in a variety of ways. For example, object status service 630 may be responsible for determining the state of settops 140 themselves or the state of applications running on settops 140.

In a step 910, RAS 315 queries object status service 630 regarding a status of foreign client 420. In a step 920, object status service 630 obtains the status of foreign client 420. In a step 930, object status service 630 returns the status of foreign client 420 to RAS 315.

In a decision step 940, RAS 315 determines whether foreign client 420 has failed based on the status returned from object status service 630. If foreign client has failed, processing continues at a step 950. Otherwise, processing returns to step 910. In step 950, RAS 315 performs callback 465 to allocating service 410 notifying allocating service 410 that foreign client 420 has failed.

In a preferred embodiment of the present invention, an example of the third scenario is implemented as follows. Foreign client 420 is settop 140 and object status service 630 is Settop Manager 380. In this embodiment, RAS 315 queries an instance of Settop Manager 380 responsible for settop 140 for the status of settop 140. This instance of Settop Manager 380 returns a status (i.e. either up or down) of settop 140 to RAS 315.

Resource Audit Service Start-up and Failure Recovery

When RAS 315 starts up or restarts after failure, RAS 315 is unaware of the status of any client 420, or any other service. The first thing RAS 315 does is to register a callback, using registerCallback, with SC 305. SC 305 invokes the callback with the list of all objects existing at the time of the registration. Furthermore, as clients register callbacks 465 with RAS 315, RAS 315 begins determining (or redetermining) the status of clients 420 with which its clients are interested.

The first time a client invokes the checkstatus operation of RAS 315 regarding a status of a particular client 420, RAS 315 marks the status of the particular client 420 as unknown and immediately releases the client. RAS 315 subsequently determines the status of the particular client 420 as discussed above. The next time the client invokes the checkstatus operation, RAS 315 returns the appropriate status to the caller. In this way, the caller is not suspended or blocked while waiting for RAS 315 to determine the status of client 420.

As other clients invoke the checkstatus operation, RAS 315 builds and maintains a list of services 430 and clients 420. Over time, RAS 315 gathers a complete list of all services 430 and clients 420 for clients that query RAS 315 regarding a status of a particular client 420.

In the event of its own failure, RAS 315 simply rebuilds its list as it did during start up. Thus, RAS 315 need not remember its state, the status of any particular service, or any registered callbacks. Each of these can be recovered as clients query RAS 315. Thus, the preferred embodiment of the present invention provides a simple start up and recovery mechanism.

EXAMPLE

Playing a Movie

Figure 12A:
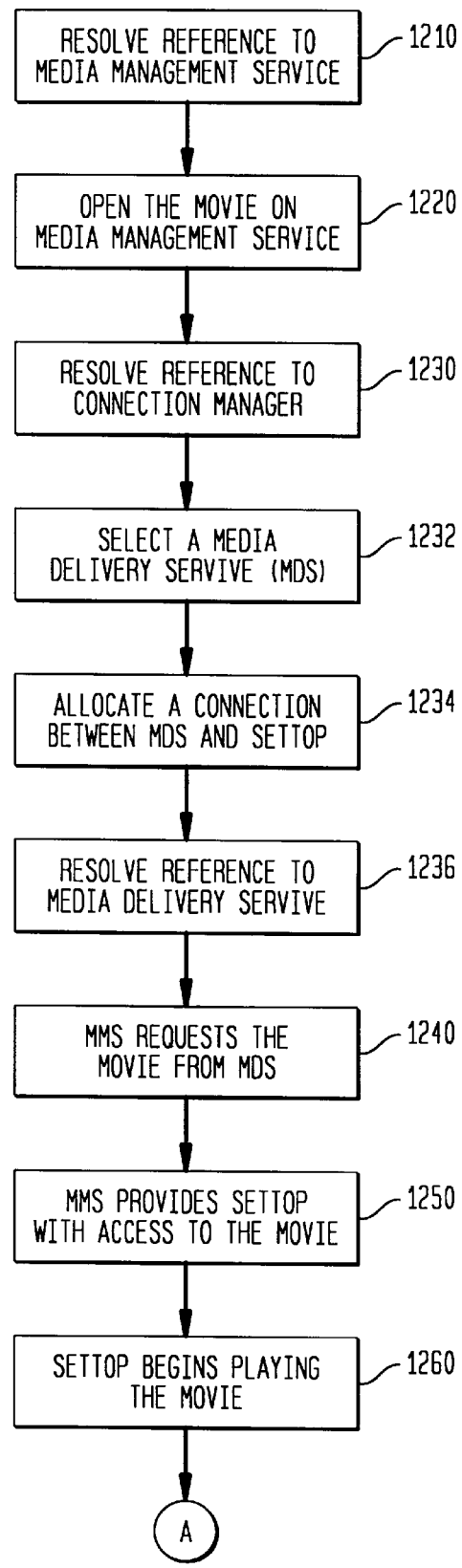
FIG. 12A–B illustrates the operations performed by the services in the typical video-on-demand session according to a preferred embodiment of the present invention.
Figure 12B:
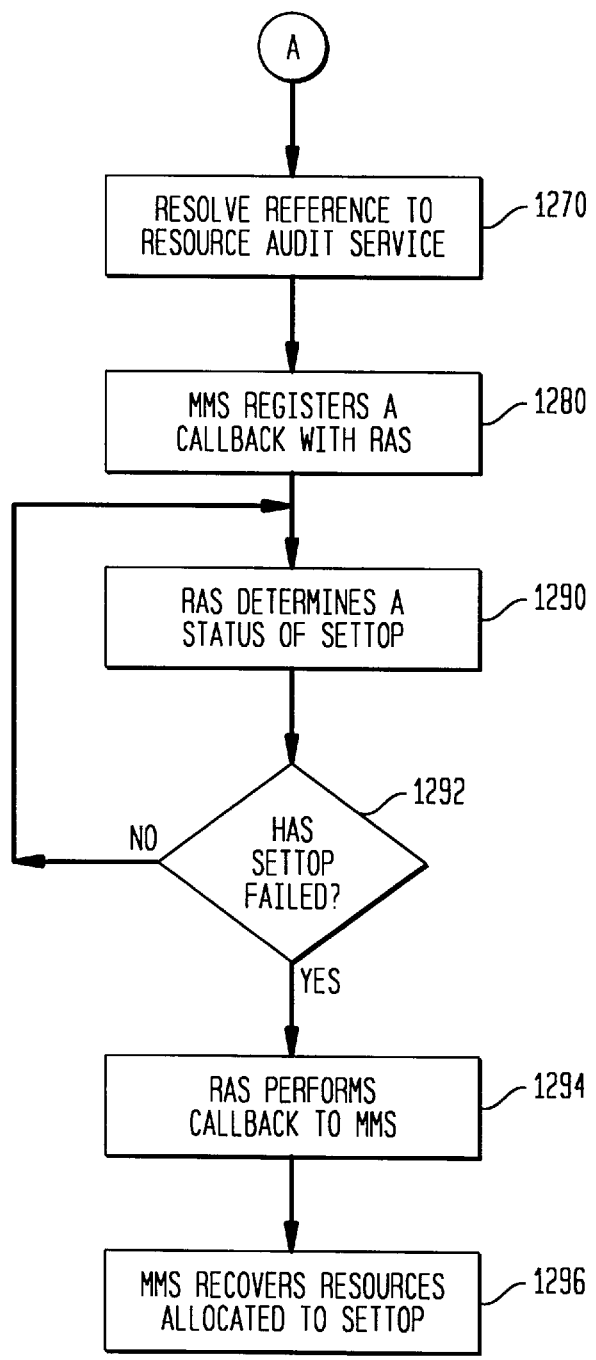

An example of a video-on-demand (VOD) session operating on ITV system 100 is discussed with reference to FIG. 11 and FIG. 12A–B. FIG. 11 is a block diagram of the services used in a typical VOD session. FIG. 12A–B illustrates the operations performed by the services during the VOD session.

Once a user has selected a VOD session, in particular, a movie, the following operation takes place in ITV system 100. As a result of the user selecting the VOD session, a VOD application 1100 is running on settop 140. VOD application 1100 controls settop 140 during the VOD session.

In a step 1210, VOD application 1100 requests (as shown by line 1110) that Name Service 320 resolve a reference to a Media Management Service (MMS) 360. Name Service 320 provides VOD application 1100 with an object reference to an instance of MMS 360.

Once VOD application 1100 has received access to MMS 360, VOD application 1100 attempts to open a movie, for example, "T2." VOD application 1100 does so, in step 1220, by invoking an open method on MMS 360 as shown by line 1120.

As discussed above, MMS 360 serves to select a Media Delivery Service (MDS) 350 to deliver a movie to settop 140 and to set up the required connections through ATM network 130. This is accomplished with the following operations. First, in a step 1230, MMS 360 resolves a reference through Name Service 320 to obtain the proper Connection Manager 345 for settop 140 as shown by line 1130.

Next, in a step 1232, MMS 360 selects a Media Delivery Service (MDS) 350 based on, for example, the availability of the movie selected and the loading on servers 120. Though, in FIG. 11, MDS 350 is illustrated as operating on the same server 120 as the rest of the services (i.e. Name Service 320, MMS 360, Connection Manager 345, MDS 350, etc.), this is not a requirement. In fact, any or all of the services in FIG. 11 may be operating on different servers 120.

Once MDS 350 has been selected, MMS 360 requests that Connection Manager 345 allocate a high-bandwidth connection on AIM network 130 between the selected MDS 350 and settop 140 in a step 1234 as shown by line 1134. Next, in a step 1236, MMS 360 resolves a reference through Name Service 320 to the selected MDS 350 as shown by line 1136.

In a step 1240, MMS 360 requests that MDS 350 provide an instance of the movie by invoking an open method on MDS 350. MDS 350 returns the instance of the movie to MMS 360 as shown by line 1140. In a step 1250, MMS 360 provides VOD application 1100 with access to the movie by returning the instance of the movie to VOD application 1100 as shown by line 1150.

Once VOD application 1100 has access to the movie from MDS 350, in a step 1260, VOD application 1100 requests that MDS 350 play the movie by invoking a play method on MDS 350 as shown by line 1160. MDS 350 responds by delivering the movie (i.e. downloading data) to settop 140.

Once MDS 350 begins delivering the movie to settop 140, in a step 1270, MMS 360 resolves a reference through Name Service 320 to a local instance of RAS 315 as shown by line 1170.

While MDS 350 delivers the movie to settop 140, in a step 1280, MMS 360 registers a callback with RAS 315. As discussed above, in the preferred embodiment, MMS 360 is actually registering a callback with library code 1010.

In a step 1290, RAS 315 determines a status of settop 140. As discussed above, library code 1010 periodically invokes checkstatus on RAS service object 1020 to determine the status of settop 140. RAS service object 1020 responds to library code 1010 by determining and providing the status of settop 140 as discussed above.

In a decision step 1292, library code 1010 determines whether settop 140 is alive or dead based on the status obtained in step 1280. If the status indicates that settop 140 has failed, processing continues at a step 1294. Otherwise, processing returns to step 1290.

In step 1294, after library code 1010 determines that settop 140 has failed, library code 1010 performs the callback to MMS 360. In a step 1296, MMS 360 recovers the resources allocated to settop 140 including the AIM network connection and MDS 350.

Although the invention has been described in detail in terms of specific embodiments, various modifications can be made without departing from the scope of the invention.

What is claimed is:

1. In a system having an allocating service that provides resources to clients, a method for recovering a resource from a client after the client fails, the method comprising the steps of:

registering a first callback with a resource audit service, wherein said first callback identifies the client, said step of registering performed by the allocating service:

determining whether the client has failed, said step of determining performed by said resource audit service; and performing said first callback when the client has failed thereby notifying the allocating service that the client has failed and allowing said resource to be recovered, said step of performing performed by said resource audit service, wherein the client is a non-local client and wherein said step of determining comprises the steps of:

polling a second resource audit service associated with said non-local client, said second resource audit service local to said non-local client, said step of polling performed by said resource audit service; and receiving a status of said non-local client from said second resource audit service, said status indicating whether said non-local client has failed, said step of receiving performed by said resource audit service.

2. In a system having an allocating service that provides resources to clients, a method for recovering a resource from a client after the client fails, the method comprising the steps of:

registering a first callback with a resource audit service, wherein said first callback identifies the client, said step of registering performed by the allocating service;

determining whether the client has failed, said step of determining performed by said resource audit service; and performing said first callback when the client has failed thereby notifying the allocating service that the client has failed and allowing said resource to be recovered, said step of performing performed by said resource audit service, wherein the client is a foreign client and wherein said step of determining comprises the steps of:

querying a status service that is associated with and aware of a status of said foreign client, said step of querying performed by said resource audit service; and receiving said status from said status service, said status indicating whether said foreign client has failed, said step of receiving performed by said resource audit service.

3. A system for recovering a resource in a distributed system, the system comprising:

an allocating service that allocates resources in the distributed system;

a client that receives the resource from said allocating service, and a resource audit service that receives a registration that the resource is allocated to said client from said allocating service, that monitors a status of said client and that notifies said allocating service when said client fails thereby allowing said allocating service to recover the resource, wherein said client is a non-local client, and wherein said resource audit service polls a second resource audit service to determine a status of said non-local client, said second resource audit service local to said non-local client.

4. A system for recovering a resource in a distributed system, the system comprising:

an allocating service that allocates resources in the distributed system;

a client that receives the resource from said allocating service; and a resource audit service that receives a registration that the resource is allocated to said client from said allocating service, that monitors a status of said client and that notifies said allocating service when said client fails thereby allowing said allocating service to recover the resource, wherein said client is a foreign client, and wherein said resource audit service queries a status service to determine a status of said foreign client, said status service associated with and aware of said status of said foreign client.

5. A computer program product for use in a computer system having an allocating service that allocates a resource to a client, the computer program product comprising:

a computer usable medium having computer readable program code means embodied in said medium for recovering the resource from the client when the client fails, said computer readable program code means comprising:

computer readable means for causing the allocating service to register a first callback with a resource audit service, wherein said first callback identifies the client:

computer readable means for causing said resource audit service to determine whether the client has failed; and computer readable means for causing said resource audit service to perform said first callback to the allocating service when the client has failed thereby allowing the resource to be recovered, wherein the client is a non-local client, and wherein said computer readable means for causing said resource audit service to determine further comprises:

computer readable means for causing said resource audit service to poll a second resource audit service, said second resource audit service local to said non-local client; and computer readable means for causing said resource audit service to receive a status of said non-local client from said second resource audit service.

6. A computer program product for use in a computer system having an allocating service that allocates a resource to a client, the computer program product comprising:

a computer usable medium having computer readable program code means embodied in said medium for recovering the resource from the client when the client fails, said computer readable program code means comprising:

computer readable means for causing the allocating service to register a first callback with a resource audit service, wherein said first callback identifies the client;

computer readable means for causing said resource audit service to determine whether the client has failed; and computer readable means for causing said resource audit service to perform said first callback to the allocating service when the client has failed thereby allowing the resource to be recovered, wherein said client is a foreign client, and wherein said computer readable means for causing said resource audit service to determine further comprises:

computer readable means for causing said resource audit service to query a status service that is associated with and aware of a status of said foreign client; and computer readable means for causing said resource audit service to receive said status from said status service.

7. In an interactive television system, a system for recovering a resource, the system comprising:

a server having an allocating service for allocating the resource:

a client connected to said server and receiving the resource from said allocating service: and a resource audit service, operating on said server, comprising:

means for receiving a registration from said allocating service, said registration identifying said client, means for determining whether said client has failed, and means for notifying said allocating service when said client has failed thereby allowing said allocating service to recover the resource, wherein said client is a non-local client operating on a second server connected to said server via a network, and wherein said means for determining further comprises:

means for polling a second resource audit service operating on said second server about a status of said non-local client; and means for receiving said status of said non-local client from said second resource audit service.

* * * * *